US011223794B2

(12) United States Patent
Haraguchi

(10) Patent No.: US 11,223,794 B2
(45) Date of Patent: Jan. 11, 2022

(54) WEARABLE CAMERA AND VIDEO DATA GENERATING METHOD

(71) Applicant: PANASONIC I-PRO SENSING SOLUTIONS CO., LTD., Fukuoka (JP)

(72) Inventor: Takayuki Haraguchi, Fukuoka (JP)

(73) Assignee: Panasonic I-PRO Sensing Solutions Co., Ltd., Fukuoka (JP)

(*) Notice: Subject to any disclaimer, the term of this patent is extended or adjusted under 35 U.S.C. 154(b) by 46 days.

(21) Appl. No.: 16/786,699

(22) Filed: Feb. 10, 2020

(65) Prior Publication Data

US 2020/0296321 A1    Sep. 17, 2020

(30) Foreign Application Priority Data

Mar. 12, 2019   (JP) .............................. JP2019-044753

(51) Int. Cl.
*H04N 5/77* (2006.01)
*H04N 7/18* (2006.01)
*H04N 5/91* (2006.01)
*H04N 5/232* (2006.01)

(52) U.S. Cl.
CPC ............. *H04N 5/772* (2013.01); *H04N 5/232* (2013.01); *H04N 5/91* (2013.01); *H04N 7/18* (2013.01)

(58) Field of Classification Search
CPC .......... H04N 5/772; H04N 5/91; H04N 5/232; H04N 7/18; H04N 7/185; H04N 9/802; H04N 9/8205
See application file for complete search history.

(56) References Cited

U.S. PATENT DOCUMENTS

| 6,445,417 | B1* | 9/2002 | Yoshida | ............... | H04N 5/2254 348/374 |
| 2011/0013075 | A1* | 1/2011 | Kim | ....................... | H04N 5/602 348/370 |
| 2017/0265012 | A1* | 9/2017 | Tico | ..................... | H04M 1/6008 |
| 2020/0084375 | A1* | 3/2020 | Tadano | ................ | H04N 5/2256 |

FOREIGN PATENT DOCUMENTS

JP           2016-181767 A      10/2016

* cited by examiner

*Primary Examiner* — Nelson D. Hernández Hernández
(74) *Attorney, Agent, or Firm* — Seed IP Law Group LLP

(57) ABSTRACT

A wearable camera includes a capturing unit configured to capture video data, a memory configured to store the video data captured by the capturing unit, a plurality of sound collectors that are arranged at different positions of a casing and that are configured to collect a sound and output signals, and a controller that is configured to determine a direction from which the sound is emitted based on a deviation of output timings of the signals and add the direction as attribute information to the video data.

9 Claims, 13 Drawing Sheets

WEARABLE CAMERA AND VIDEO DATA
GENERATING METHOD

BACKGROUND OF THE INVENTION

1. Field of the Invention

The present disclosure relates to a wearable camera and a video data generating method.

2. Background Art

In recent years, wearable cameras have been introduced to support works of police officers, security guards, or the like (see, for example, JP2016-181767A). A wearable camera is attached to a body or worn clothes or the like of a police officer, a security guard, or the like and captures a video of a scene or the like.

There is a case, for example, that a police officer retunes to a police station, plays a video recorded by a wearable camera using a terminal device in the police station, and creates a report relating to an incident based on the played video.

A video data recorded by a wearable camera sometimes contains a sound relating to an incident such as a gunshot. The video data sometimes contains a voice uttered from a police officer, a suspect, an eyewitness, or the like.

When creating a report, a direction from which a sound is emitted is sometimes described. If the video data contains information about the sound emission direction, it may be easy to create the report.

SUMMARY OF THE INVENTION

A non-limiting embodiment of the present disclosure contributes to the provision of a wearable camera which facilitates creation of a report based on video data.

A wearable camera according to an aspect of the present disclosure includes: a capturing unit that is configured to capture video data; a memory that is configured to store the video data captured by the capturing unit; a plurality of sound collectors that are arranged at different positions of a casing and that are configured to collect a sound and output signals; and a controller that is configured to determine a direction from which the sound is emitted based on a deviation of output timings of the signals and add the direction as attribute information to the video data.

A video data generating method according to another aspect of the present disclosure is a video data generating method implemented by a wearable camera, the method includes: determining a direction from which a sound is emitted based on a deviation of output timings of signals which are respectively output from a plurality of sound collectors that are arranged at different positions of a casing and collect the sound; and adding the direction as attribute information to video data which is captured by a capturing unit.

These general and specific modes may be embodied by a system, a device, a method, an integrated circuit, a computer program, or a recording medium, or may be embodied by any combination of a system, a device, a method, an integrated circuit, a computer program, and a recording medium.

According to the aspects of the present disclosure, a report can be easily created based on video data.

Further advantages and effects according to the aspects of the present disclosure will be apparent from the description and the drawings. Such advantages and/or effects are provided by features described in some embodiments, the description and the drawings, but all are not necessarily provided to obtain one or more identical features.

DETAILED DESCRIPTION OF THE EXEMPLRAY EMBODIMENT

An embodiment of the present invention will be explained in detail with reference to accompanying drawings as appropriate. However, more detailed description than necessary may be omitted. For example, detailed explanation of already well-known matters and duplicate explanation for substantially the same configuration may be omitted. This is to avoid the following explanation becoming unnecessarily redundant and to facilitate understanding by those skilled in the art.

The attached drawings and the following description are provided to enable those skilled in the art to fully understand the present disclosure but not intended to limit the claimed subject matter.

Figure 1:
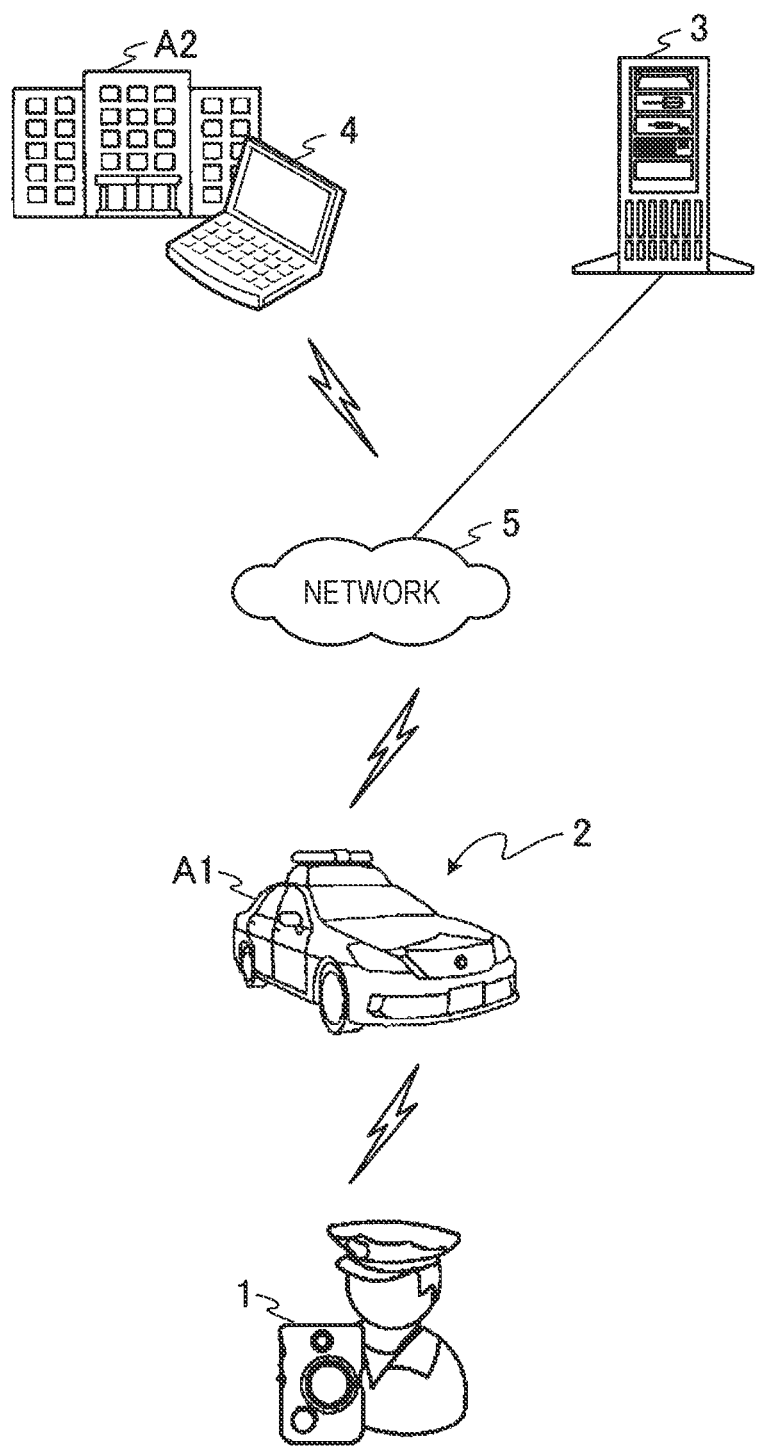
FIG. 1 is a diagram illustrating a configuration example of a wearable camera system according to an embodiment.

FIG. 1 is a diagram illustrating a configuration example of a wearable camera system according to an embodiment. As illustrated in FIG. 1, the wearable camera system includes a wearable camera 1, an in-vehicle system 2, a server 3, and a terminal device 4.

The in-vehicle system 2, the server 3, and the terminal device 4 are connected via a network 5. The wearable camera 1 is connected to the server 3 and the terminal device 4 via the in-vehicle system 2 and the network 5. Examples of the network 5 may include a wireless communication network such as a mobile terminal, and a network such as the Internet.

Figure 2:
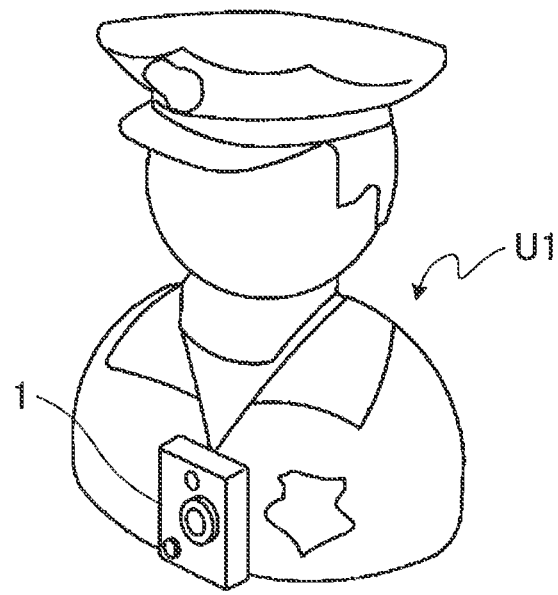
FIG. 2 is a diagram illustrating an example of the upper body of a police officer wearing a wearable camera.

The wearable camera 1 is, for example, worn or had by a police officer (for example, see FIG. 2). The wearable camera 1 communicates with the in-vehicle system 2, for example, via Near Field Communication such as Wi-Fi (registered trademark) or Bluetooth (registered trademark).

The in-vehicle system 2 is mounted on, for example, a police vehicle A1. The in-vehicle system 2 includes, for example, an in-vehicle camera (not illustrated), a control device (not illustrated) such as a personal computer, and a communication device (not illustrated). For example, the in-vehicle system 2 receives video data, which is captured by the wearable camera 1, from the wearable camera 1. The in-vehicle system 2 transmits the video data received from the cameral 1 to the server 3 via the network 5. The in-vehicle system 2 also transmits video data captured by the in-vehicle camera to the server 3 via the network 5.

The server 3 stores the video data captured by the wearable camera 1 and the video data captured by the in-vehicle camera of the in-vehicle system 2. The server 3 also stores a report, etc. created by the terminal device 4.

The terminal device 4 is used, for example, by a police officer in a police station A2. In response to an operation by a police officer, the terminal device 4 accesses the server 3 and displays video data stored in the server 3 on a display device. In response to an operation by a police officer, the terminal device 4 also creates a report relating to an incident or the like. For example, a police officer plays a video or a video captured (recorded) by the wearable camera 1 using the terminal device 4 and creates a report relating to an incident based on the played image or video. The terminal device 4 transmits the created report to the server 3 via the network 5.

Although the wearable camera 1 is connected to the server 3 and the terminal device 4 via the in-vehicle system 2 and the network 5, the arrangement is not limited thereto. The wearable camera 1 may be connected to the server 3 and the terminal device 4 via the network 5 without passing through the in-vehicle system 2.

FIG. 2 is a diagram illustrating an example of the upper body of a police officer U1 wearing the wearable camera 1. In FIG. 2, portions identical to those of FIG. 1 are referred to by the common symbols.

The wearable camera 1 is mounted or held on the front of the uniform of the police officer U1 to video the front (front direction) of the police officer U1 who is a user. That is, the wearable camera 1 is disposed beneath the face of the police officer U1 such that the front of a casing of the wearable camera 1 faces forward with respect to the police officer U1.

The wearable camera 1 may, for example, be fixed to the front of the uniform in a state of being suspended from the neck of the police officer with a string. The wearable camera 1 may be fixed to the front of the uniform by engaging an attachment member (for example, an attachment clip) attached to the back of the casing of the wearable camera 1 with an attached member attached to the front of the uniform.

Figure 3:
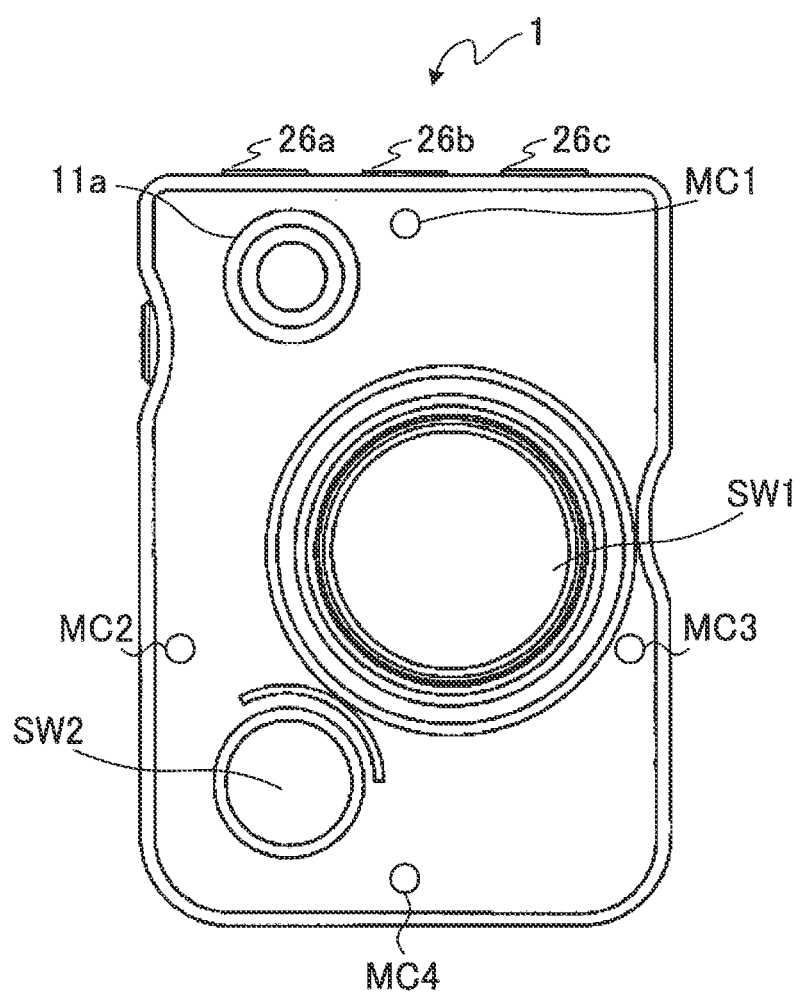
FIG. 3 is a diagram illustrating an example of the appearance of the wearable camera.

FIG. 3 is a diagram illustrating an example of the appearance of the wearable camera 1. As illustrated in FIG. 3, a camera lens 11*a*, microphones MC1 to MC4, and switches SW1, SW2 are disposed on the front of the casing of the wearable camera 1. Light emitting diodes (LEDs) 26*a* to 26*c* are disposed on the top of the casing of the wearable camera 1.

The microphones MC1 to MC4 collect a voice uttered from the police officer and ambient sounds. The microphone MC1 is disposed above the microphone MC4. For example, the microphone MC1 is disposed above in the vertical direction of the microphone MC4. In other words, the microphone MC1 is disposed closer to the face of the police officer than the microphone MC4.

As described later, the wearable camera 1 determines the direction from which a sound is emitted based on deviations of output timings of signals output from the respective microphones MC1 to MC4. To this end, the microphones MC1 and MC4 are preferably disposed as far as possible from each other. For example, the microphone MC1 may be disposed at the upper end on the front of the casing. The microphone MC4 may be disposed at the lower end on the front of the casing.

The microphone MC1 may be disposed on the top of the casing of the wearable camera 1. In this case, the microphone MC1 picks up a voice of the police officer U1 more easily than when disposed on the front of the casing.

The microphones MC2 and MC3 are disposed between the microphone MC1 and the microphone MC4 and on the left and right with respect to a line connecting the microphone MC1 and the microphone MC4. For example, when the wearable camera 1 is viewed from the front side, the microphone MC2 is disposed on the left with respect to the line connecting the microphone MC1 and the microphone MC4. The microphone MC3 is disposed on the right with respect to the line connecting the microphone MC1 and the microphone MC4.

As described later, the wearable camera 1 determines the direction from which a sound is emitted based on deviations of output timings of signals output from the respective microphones MC1 to MC4. To this end, the microphones MC2 and MC3 are preferably disposed as far as possible from each other. For example, the microphone MC2 may be disposed at the left end on the front of the casing. The microphone MC3 may be disposed at the right end on the front of the casing. The microphones MC2 and MC3 are preferably disposed as far as possible from the microphones MC1 and MC4.

The switch SW1 is a button switch which accepts an operation to start/stop capturing (recording of moving pictures) of the wearable camera 1. For example, the wearable camera 1 starts imaging when the switch SW1 is pressed once. The wearable camera 1 stops the imaging when the switch SW1 is pressed once more. The wearable camera 1 starts imaging again when the switch SW1 is pressed further once more.

The switch SW2 is a button switch which accepts an imaging operation of a still image of the wearable camera 1. For example, the wearable camera 1 captures a still image each time the switch SW2 is pressed once.

The LEDs 26*a* to 26*c* indicate, by the lighting state thereof, an operation state of the wearable camera 1. For example, the LEDs 26*a* to 26*c* indicate by the lighting state thereof whether or not the wearable camera 1 is recording.

Figure 4:
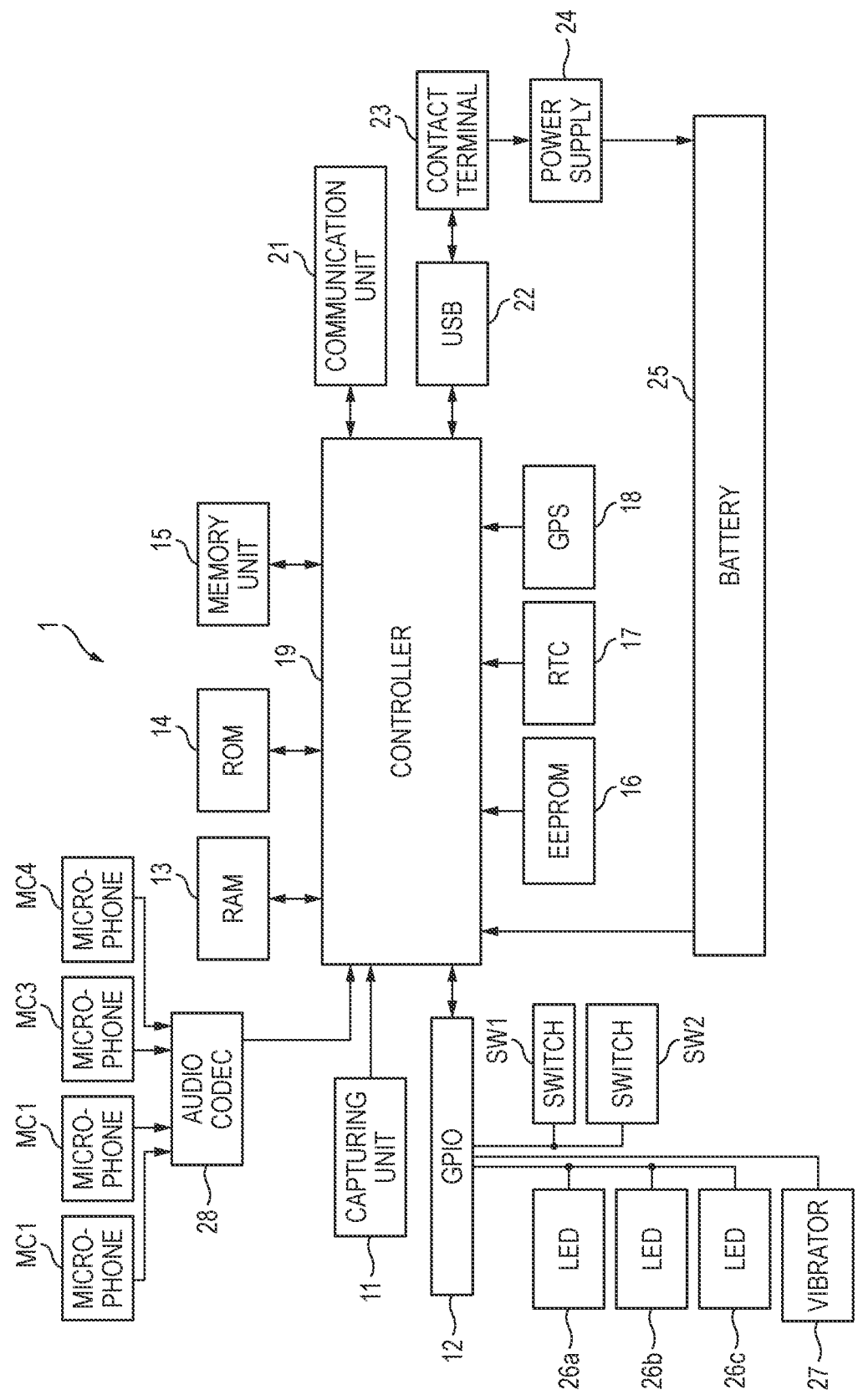
FIG. 4 is a diagram illustrating an example of a block configuration of the wearable camera of FIG. 3.

FIG. 4 is a diagram illustrating an example of the block configuration of the wearable camera 1 in FIG. 3. As illustrated in FIG. 4, the wearable camera 1 includes an imaging unit 11, a general purpose input/output (GPIO) 12, a random access memory (RAM) 13, a read only memory (ROM) 14, a memory unit 15, an electrically erasable programmable read-only memory (EEPROM) 16, a real time clock (RTC) 17, a global positioning system (GPS) 18, a controller 19, a communication unit 21, a universal serial bus (USB) 22, a contact terminal 23, a power supply 24, a battery 25, the LEDs 26a, 26b, 26c, a vibrator 27, an audio CODEC 28, the switches SW1, SW2, and the microphones MC1 to MC4.

The imaging unit 11 includes the camera lens 11a (see FIG. 3) and a solid-state imaging device (not illustrated). The solid-state imaging device converts light received via the camera lens 11a into an electrical signal. The imaging unit 11 outputs the electrical signal (video data) of the solid-state imaging device to the controller 19.

The GPIO 12 is a serial-parallel conversion interface. The GPIO 12 performs input and output of signals between the controller 19 and the switches SW1, SW2, LEDs 26a to 26c, and vibrator 27.

The RAM 13 is a work memory used in the operation of the controller 19.

The ROM 14 is a memory which stores a program for controlling the controller 19 and data in advance.

The memory unit 15 is, for example, an external storage medium such as an SD memory. The memory unit 15 stores video data obtained by performing imaging with the imaging unit 11. The memory unit 15 can be attached to and detached from the casing body of the wearable camera 1.

The EEPROM 16 stores identification information (for example, a camera ID) for identifying the wearable camera 1 and other setting information.

The RTC 17 counts current time information and outputs the count result to the controller 19.

The GPS 18 receives a GPS signal transmitted from a GPS transmitter and calculates current positional information of the wearable camera 1. The GPS 18 outputs the calculated positional information to the controller 19.

The controller 19 operates according to the program and data stored in the ROM 14 and controls the entire wearable camera 1. For example, the controller 19 performs an input and output processing of data between the individual portions, an arithmetic (calculation) processing of data, and a storage processing of data. The controller 19 may be configured by, for example, a central processing unit (CPU) or a digital signal processor (DSP).

The communication unit 21 connects between the controller 19 and the in-vehicle system 2 in, for example, the physical layer as the first layer of the Open System Interconnection (OSI) reference model.

The USB 22 enables, for example, the connection with the in-vehicle system 2. The USB 22 further enables, for example, the connection with the terminal device 4 in the police station A2.

The contact terminal 23 is a terminal electrically connected to a cradle (not illustrated) or an external adaptor (not illustrated). The contact terminal 23 is connected to the controller 19 via the USB 22 and also connected to the power supply 24. The wearable camera 1 can be charged via the cradle or the adaptor or can communicate with an external device.

The power supply 24 supplies the battery 25 with power of a power supply which is fed from the cradle or the external adapter via the contact terminal 23.

The battery 25 is formed of a chargeable secondary battery and supplies the individual portions of the wearable camera 1 with the power of the power supply.

The switch SW1 is the button switch which accepts the operation to start/stop the imaging of the wearable camera 1. The switch SW2 is the button switch which accepts the imaging operation of a still image of the wearable camera 1.

The LEDs 26a to 216c indicate, by the lighting state thereof, an operation state of the wearable camera 1. The vibrator 27 indicate, by the vibration thereof, an operation state of the wearable camera 1.

The microphones MC1 to MC4 collect a voice uttered from the police officer wearing the wearable camera 1 and ambient sounds, and output signals obtained from the collected voice and sounds to the audio CODES 28. The audio CODES 28 encodes (compresses) the signals and outputs the encoded signal to the controller 19.

Hereinafter, determination of the sound emission direction will be described.

Figure 5:
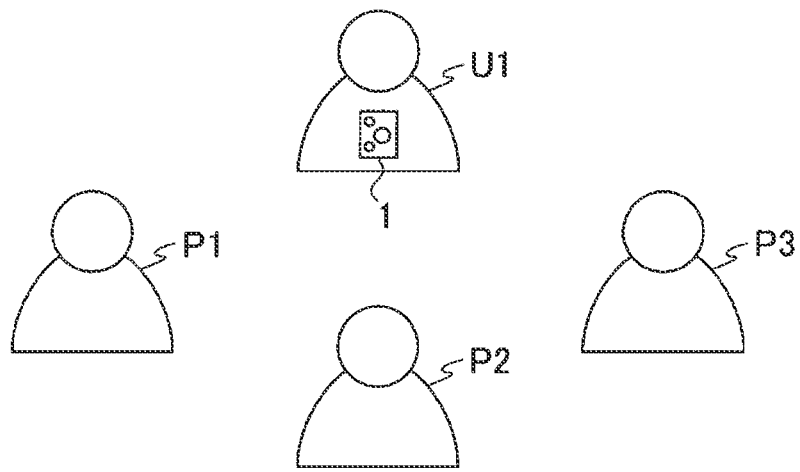
FIG. 5 is a diagram illustrating speakers.

FIG. 5 is a diagram illustrating speakers. FIG. 5 illustrates the police officer U1 illustrated in FIG. 2 and persons P1 to P3. The persons P1 to P3 are each, for example, a criminal, a suspect, a witness, or an eyewitness.

The person P1 stands on the right side as viewed from the police officer U1. The person P2 stands on the front side as viewed from the police officer U1. The person P3 stands on the left side as viewed from the police officer U1. The persons P1 to P3 stand toward the police officer U1.

The police officer U1 wears the wearable camera 1. The police officer U1 starts the recording by pressing the switch SW1 of the wearable camera 1 and, for example, interview the persons P1 to P3.

Figure 6:
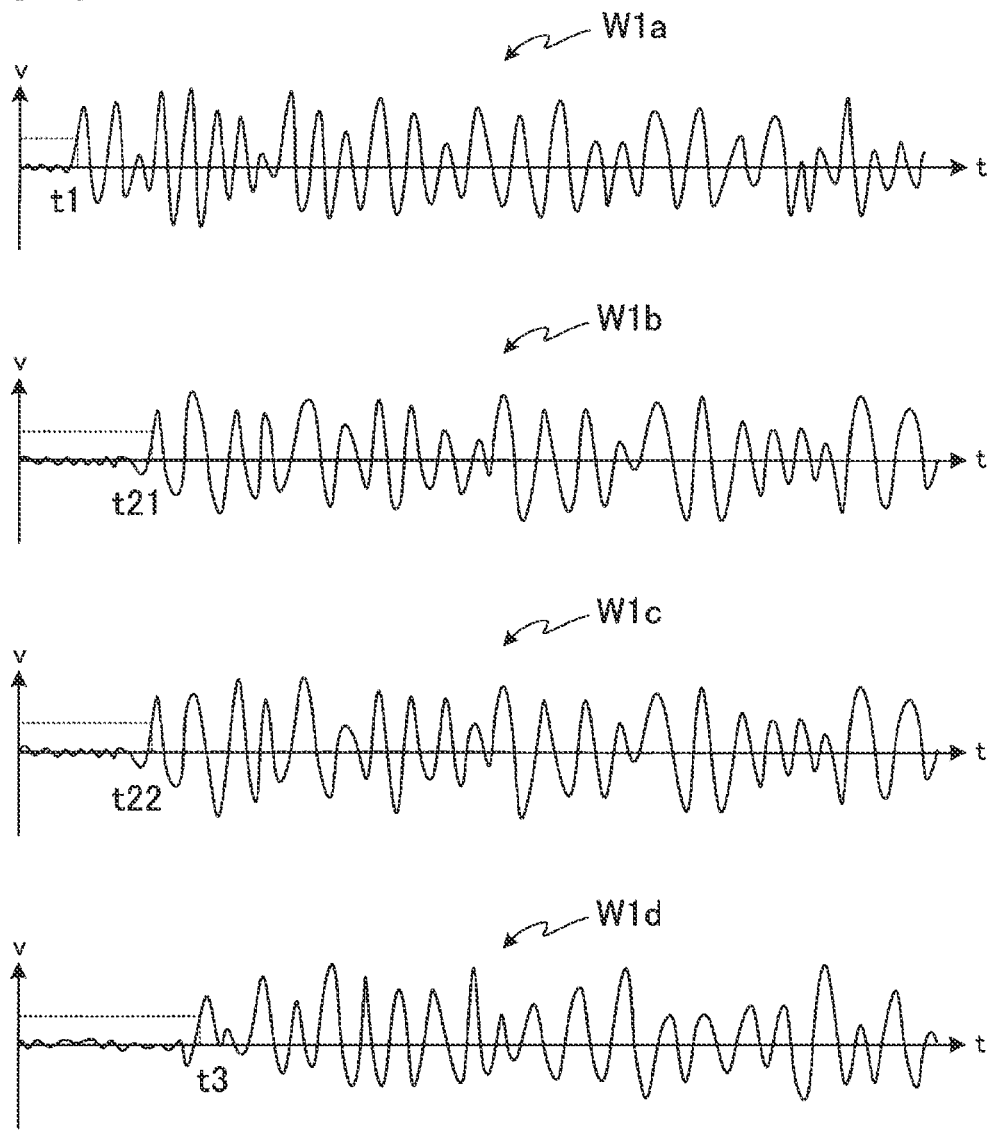
FIG. 6 is a diagram illustrating an example of waveforms of signals output from microphones when a police officer illustrated in FIG. 5 speaks.

FIG. 6 is a diagram illustrating an example of waveforms of signals output from the microphones MC1 to MC4 when the police officer U1 illustrated in FIG. 5 speaks. In FIG. 6, the horizontal axis represents time and the vertical axis represents voltage.

A waveform W1a illustrated in FIG. 6 represents a waveform of a signal output from the microphone MC1. A waveform W1b illustrated in FIG. 6 represents a waveform of a signal output from the microphone MC2. A waveform W1c illustrated in FIG. 6 represents a waveform of a signal output from the microphone MC3. A waveform W1d illustrated in FIG. 6 represents a waveform of a signal output from the microphone MC4.

The microphone MC1 is located closest to the mouth of the police officer U1 illustrated in FIG. 5 (see FIGS. 2 and 3). The microphones MC2 and MC3 are located second closest to the mouth of the police officer U1 after the microphone MC1. The microphone MC4 is located farthest from the mouth of the police officer U1.

Thus, a voice uttered by the police officer U1 reaches the microphones MC1 to MC4 at different times. Since the voice uttered by the police officer U1 reaches the microphones MC1 to MC4 at different times, the microphones MC1 to MC4 output signals (signals based on the uttered voice of the police officer) at different timings.

For example, as illustrated by the waveform W1a, the signal is firstly output from the microphone MC1. For example, the signal is output from the microphone MC1 at a time t1.

Subsequently, as illustrated by the waveforms W1b and W1c, the signals are output from the microphones MC2 and MC3. For example, the signals are output from the microphones MC2 and MC3 at times t21 and t22. The distance between the microphone MC2 and the mouth of the police officer U1 is substantially the same as the distance between the microphone MC3 and the mouth of the police officer U1, and thus the signals are output from the microphones MC2 and MC3 almost at the same time t21 and t22.

Lastly, as illustrated by the waveform W1d, the signal is output from the microphone MC4. For example, the signal is output from the microphone MC4 at a time t3.

The controller 19 determines the direction from which the sound is emitted based on the deviation of the output timings of the signals output from the microphones MC1 to MC4.

For example, the controller 19 determines the microphone which first output the signal. In the case of the example in FIG. 6, the microphone that first output the signal is the microphone MC1 among the microphones MC1 and MC4 arranged in the upper-lower direction. The controller 19 determines that the sound is emitted at least from the upper direction of the wearable camera 1.

When the controller 19 determines the microphone which first output the signal, the controller 19 thereafter determines the microphone which second output the signal. In the case of the example in FIG. 6, the microphones that second output the signals (output at approximately the same time) are the microphones MC2 and MC3 arranged in the left-right direction. The controller 19 determines that the sound is emitted from the center in the left-right direction of the wearable camera 1.

The controller 19 determines the microphone that output the signal further next. In the case of the example in FIG. 6, the microphone that output the signal further next is the microphone MC4 among the microphones MC1 and MC4 arranged in the upper-lower direction. The controller 19 determines that the sound is emitted from the upper direction of the wearable camera 1 based on the microphone MC1 which first output the signal and the microphone MC4 which last output the signal.

From the above, the controller 19 determines that the sound is emitted from the upper direction of the wearable camera 1.

When the controller 19 determines that the sound is emitted from the upper direction of the wearable camera 1, the controller 19 may determine that the police officer U1 who has the wearable camera 1 has uttered a voice.

Further, the controller 19 may determine that the signals are output from the microphones MC1 to MC4 when the magnitudes of the respective signals output from the microphones MC1 to MC4 exceed a predetermined threshold. In other words, the controller 19 may determine the sound emission direction based on the signal (signal of a voice, a gunshot, or a specific sound such as a collision sound due to an accident) exceeding the predetermined threshold.

Figure 7:
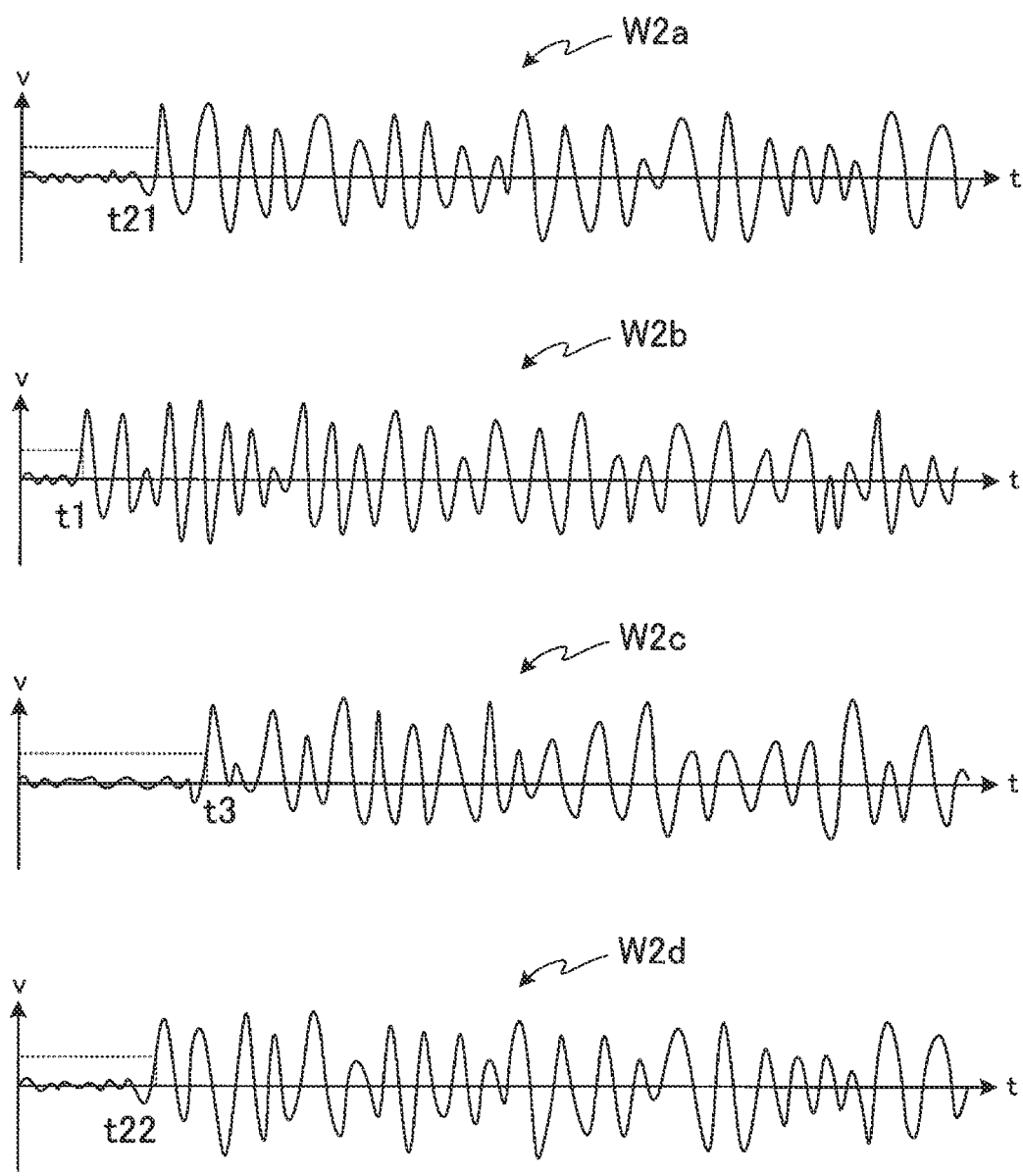
FIG. 7 is a diagram illustrating an example of waveforms of signals output from microphones when a person illustrated in FIG. 5 speaks.

FIG. 7 is a diagram illustrating an example of waveforms of signals output from the microphones MC1 to MC4 when the person P1 illustrated in FIG. 5 speaks. In FIG. 7, the horizontal axis represents time and the vertical axis represents voltage.

A waveform W2a illustrated in FIG. 7 represents a waveform of a signal output from the microphone MC1. A waveform W2b illustrated in FIG. 7 represents a waveform of a signal output from the microphone MC2. A waveform W2c illustrated in FIG. 7 represents a waveform of a signal output from the microphone MC3. A waveform W2d illustrated in FIG. 7 represents a waveform of a signal output from the microphone MC4.

The microphone MC2 is located closest to the person P1 (the mouth of the person P1) illustrated in FIG. 5 (see FIGS. 2 and 3). The microphones MC1 and MC4 are located second closest to the person P1 after the microphone MC2. The microphone MC3 is located farthest from the person P1.

Thus, a voice uttered by the person P1 reaches the microphones MC1 to MC4 at different times. Since the voice uttered by the person P1 reaches the microphones MC1 to MC4 at different times, the microphones MC1 to MC4 output signals (signals based on the uttered voice of the person P1) at different timings.

For example, as illustrated by the waveform W2b, the signal is firstly output from the microphone MC2. For example, the signal is output from the microphone MC2 at a time t1.

Subsequently, as illustrated by the waveforms W2a and W2d, the signals are output from the microphones MC1 and MC4. For example, the signals are output from the microphones MC1 and MC4 at times t21 and t22. The distance between the microphone MC1 and the person P1 is substantially the same as the distance between the microphone MC4 and the person P1, and thus the signals are output from the microphones MC1 and MC4 almost at the same time t21 and t22.

Lastly, as illustrated by the waveform W2c, the signal is output from the microphone MC3. For example, the signal is output from the microphone MC3 at a time t3.

The controller 19 determines the direction from which the sound is emitted based on the deviation of the output timings of the signals output from the microphones MC1 to MC4.

For example, the controller 19 determines the microphone which first output the signal. In the case of the example in FIG. 7, the microphone that first output the signal is the microphone MC2 among the microphones MC2 and MC3 arranged in the left-right direction. The controller 19 determines that the sound is emitted at least from the right direction when viewed from the front direction of the wearable camera 1 (as viewed from the police officer U1).

When the controller 19 determines the microphone which first output the signal, the controller 19 thereafter determines the microphone which second output the signal. In the case of the example in FIG. 7, the microphones that second output the signals (output at approximately the same time) are the microphones MC1 and MC4 arranged in the upper-lower direction. The controller 19 determines that the sound is emitted from almost the center in the upper-lower direction of the wearable camera 1.

The controller 19 determines the microphone that output the signal further next. In the case of the example in FIG. 7, the microphone that output the signal further next is the microphone MC3 among the microphones MC2 and MC3 arranged in the left-right direction. The controller 19 determines that the sound is emitted from the right direction of the wearable camera 1 based on the microphone MC2 which first output the signal and the microphone MC3 which last output the signal.

From the above, the controller 19 determines that the sound is emitted from the right direction of the wearable camera 1.

Figure 8:
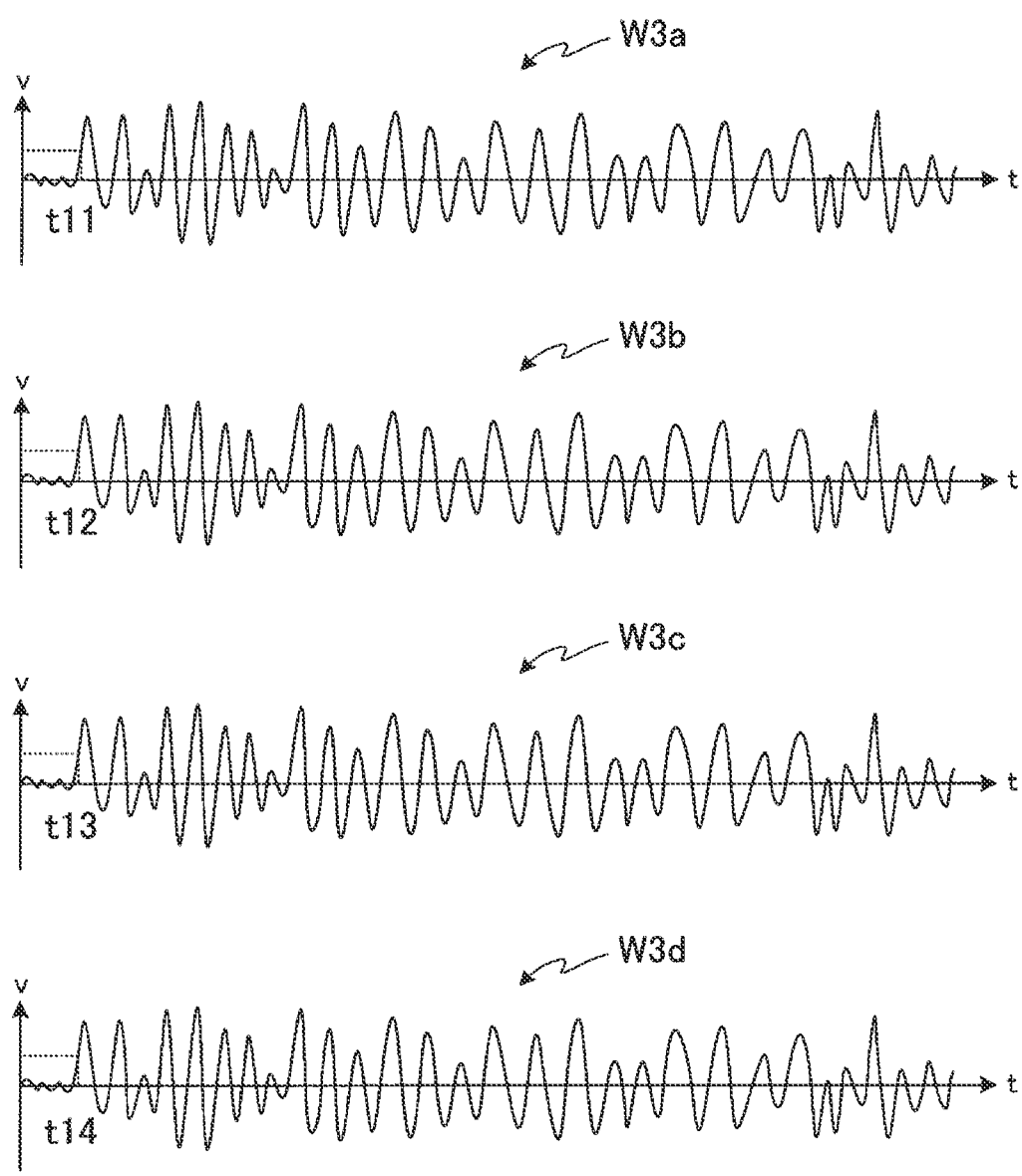
FIG. 8 is a diagram illustrating an example of waveforms of signals output from microphones when a person illustrated in FIG. 5 speaks.

FIG. 8 is a diagram illustrating an example of waveforms of signals output from the microphones MC1 to MC4 when the person P2 illustrated in FIG. 5 speaks. In FIG. 8, the horizontal axis represents time and the vertical axis represents voltage.

A waveform W3a illustrated in FIG. 8 represents a waveform of a signal output from the microphone MC1. A waveform W3b illustrated in FIG. 8 represents a waveform of a signal output from the microphone MC2. A waveform W3c illustrated in FIG. 8 represents a waveform of a signal output from the microphone MC3. A waveform W3d illustrated in FIG. 8 represents a waveform of a signal output from the microphone MC4.

The microphones MC1 to MC4 are each at substantially the same distance from the person P2 (the mouth of the person P2) illustrated in FIG. 5.

Thus, a voice uttered by the person P2 reaches the microphones MC1 to MC4 at substantially the same time.

For example, as illustrated by the waveforms W3a to W3d, signals are output from the microphones MC1 to MC4 at approximately the same time t11 to t14, respectively. When the signals are output from the microphones MC1 to MC4 at substantially the same time t11 to t14, the controller 19 determines that the sound is emitted from the front direction of the wearable camera 1.

Figure 9:
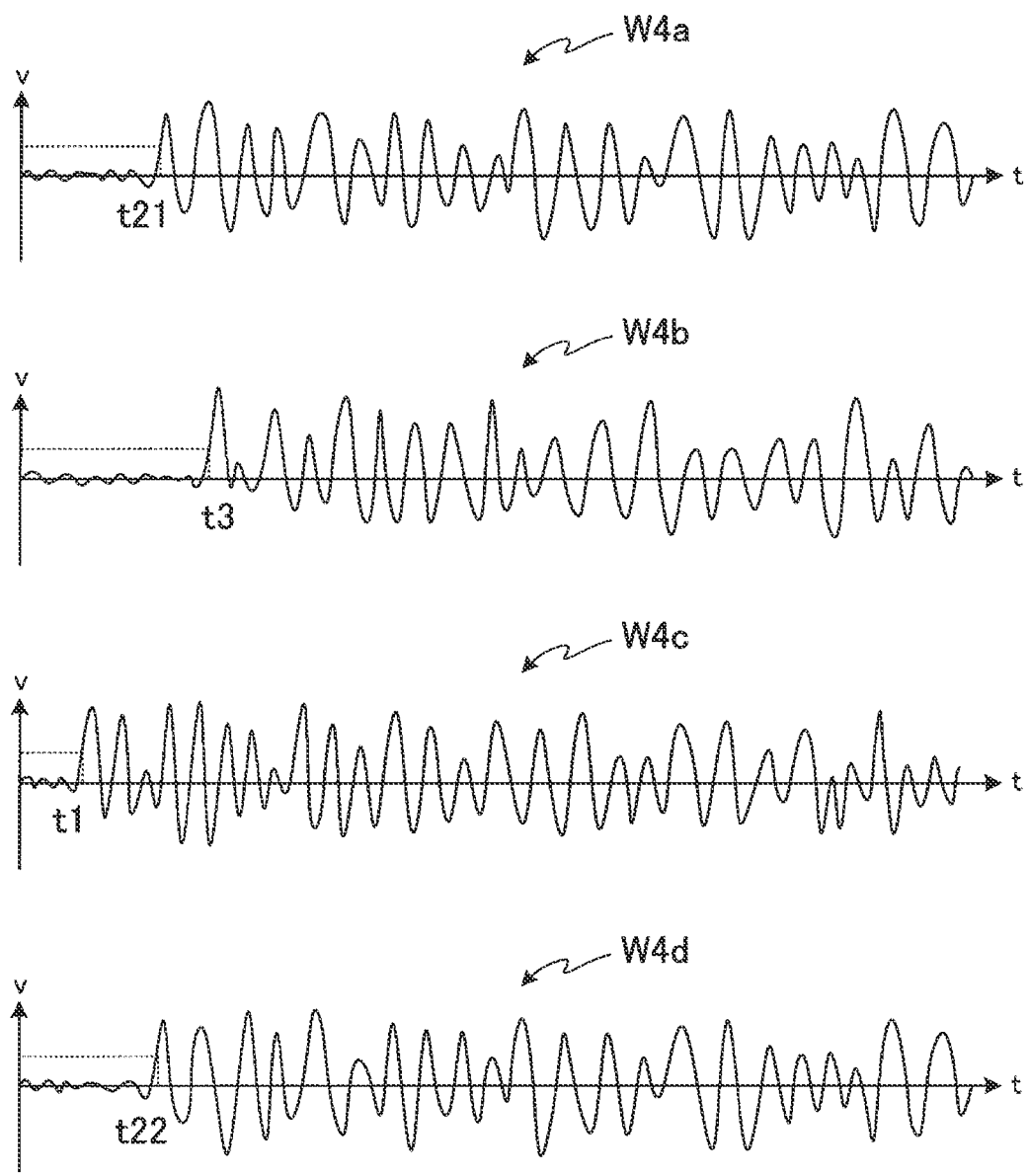
FIG. 9 is a diagram illustrating an example of waveforms of signals output from microphones when a person illustrated in FIG. 5 speaks.

FIG. 9 is a diagram illustrating an example of waveforms of signals output from the microphones MC1 to MC4 when the person P3 illustrated in FIG. 5 speaks. In FIG. 9, the horizontal axis represents time and the vertical axis represents voltage.

A waveform W4a illustrated in FIG. 9 represents a waveform of a signal output from the microphone MC1. A waveform W4b illustrated in FIG. 9 represents a waveform of a signal output from the microphone MC2. A waveform W4c illustrated in FIG. 9 represents a waveform of a signal output from the microphone MC3. A waveform W4d illustrated in FIG. 9 represents a waveform of a signal output from the microphone MC4.

The microphone MC3 is located closest to the person P3 (the mouth of the person P3) illustrated in FIG. 5 (see FIGS. 2 and 3). The microphones MC1 and MC4 are located second closest to the person P3 after the microphone MC3. The microphone MC2 is located farthest from the person P3.

Thus, a voice uttered by the person P3 reaches the microphones MC1 to MC4 at different times. Since the voice uttered by the person P3 reaches the microphones MC1 to MC4 at different times, the microphones MC1 to MC4 output signals (signals based on the uttered voice of the person P3) at different timings.

For example, as illustrated by the waveform W4c, the signal is firstly output from the microphone MC3. For example, the signal is output from the microphone MC3 at a time t1.

Subsequently, as illustrated by the waveforms W4a and W4d, the signals are output from the microphones MC1 and MC4. For example, the signals are output from the microphones MC1 and MC4 at times t21 and t22. The distance between the microphone MC1 and the person P3 is substantially the same as the distance between the microphone MC4 and the person P3, and thus the signals are output from the microphones MC1 and MC4 almost at the same time t21 and t22.

Lastly, as illustrated by the waveform W4b, the signal is output from the microphone MC2. For example, the signal is output from the microphone MC2 at a time t3.

The controller 19 determines the direction from which the sound is emitted based on the deviation of the output timings of the signals output from the microphones MC1 to MC4. For example, the controller 19 determines the microphone which first output the signal. In the case of the example in FIG. 9, the microphone that first output the signal is the microphone MC3 among the microphones MC2 and MC3 arranged in the left-right direction. The controller 19 determines that the sound is emitted at least from the left direction of the wearable camera 1.

When the controller 19 determines the microphone which first output the signal, the controller 19 thereafter determines the microphone which second output the signal. In the case of the example in FIG. 9, the microphones that second output the signals (output at approximately the same time) are the microphones MC1 and MC4 arranged in the upper-lower direction. The controller 19 determines that the sound was emitted from almost the center in the upper-lower direction of the wearable camera 1.

The controller 19 determines the microphone that output the signal further next. In the case of the example in FIG. 9, the microphone that output the signal further next is the microphone MC2 among the microphones MC2 and MC3 arranged in the left-right direction. The controller 19 determines that the sound was emitted from the left direction of the wearable camera 1 based on the microphone MC3 which first output the signal and the microphone MC2 which last output the signal.

From the above, the controller 19 determines that the sound is emitted from the left direction of the wearable camera 1.

In FIGS. 6 to 9, the controller 19 determines the voice emission direction of a person, but the disclosure is not limited to this. For example, the controller 19 may determine the emission direction of a sound related to an incident such as a gunshot or a collision sound caused by an accident. The method for determining the emission direction of a sound related to an incident is the same as the method described with reference to FIGS. 6 to 9.

When the controller 19 determines the sound emission direction, the controller 19 adds the determined sound emission direction as attribute information to the video data.

Figure 10:
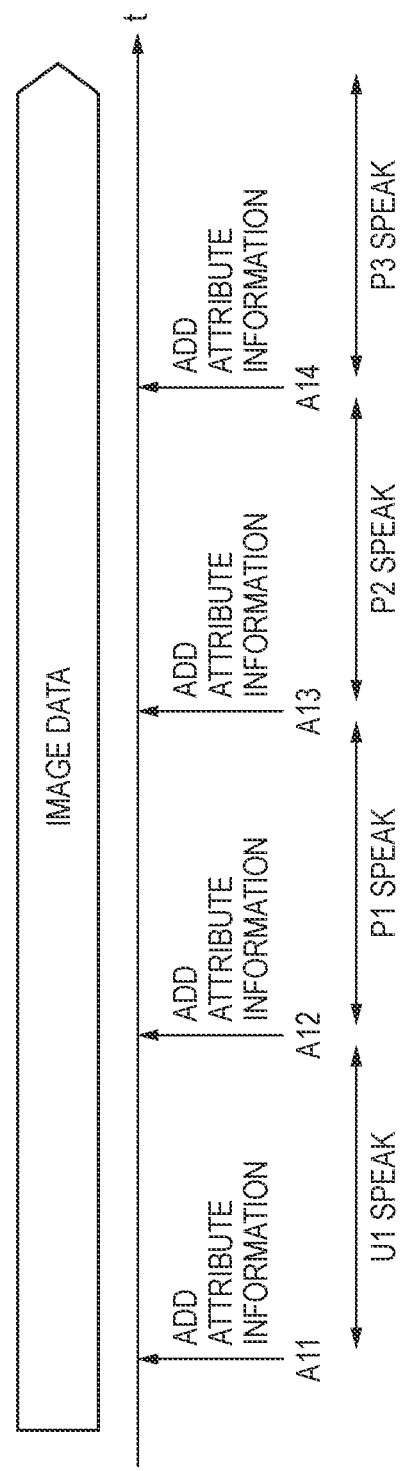
FIG. 10 is a diagram explaining addition of attribute information.

FIG. 10 is a diagram explaining the addition of the attribute information. FIG. 10 illustrates video data. The video data contains sound data. In FIG. 10, the horizontal axis represents time. The police officer U1 and the person P1 to P3 illustrated in FIG. 5 speak during respective periods indicated by double-headed arrows in FIG. 10.

The controller 19 determines the sound emission direction based on the output timings of the signals output from the microphones MC1 to MC4.

For example, when the police officer U1 speaks, the controller 19 determines that the sound is emitted from the upper direction of the wearable camera 1. When the controller 19 determines the sound emission direction, the controller 19 adds the attribute information, indicating that the sound emission direction is above the wearable camera 1, to the video data at the time when the police officer U1 starts speaking, as illustrated by an arrow A11 in FIG. 10. When the person P1 speaks, the controller 19 determines that the sound is emitted from the right direction of the wearable camera 1. When the controller 19 determines the sound emission direction, the controller 19 adds the attribute information, indicating that the sound emission direction is the right direction of the wearable camera 1, to the video data at the time when the person P1 starts speaking, as illustrated by an arrow Al2 in FIG. 10.

When the person P2 speaks, the controller 19 determines that the sound is emitted from the front direction of the wearable camera 1. When the controller 19 determines the sound emission direction, the controller 19 adds the attribute information, indicating that the sound emission direction is the front direction of the wearable camera 1, to the video data at the time when the person P2 starts speaking, as illustrated by an arrow A13 in FIG. 10.

When the person P3 speaks, the controller 19 determines that the sound is emitted from the left direction of the wearable camera 1. When the controller 19 determines the sound emission direction, the controller 19 adds the attribute information, indicating that the sound emission direction is the left direction of the wearable camera 1, to the video data at the time when the person P3 starts speaking, as illustrated by an arrow A14 in FIG. 10.

When the controller 19 adds the attribute information about the sound emission direction to the video data, the controller 19 may add time and positional information in the video of the video data to the video data as the attribute information.

Figure 11:
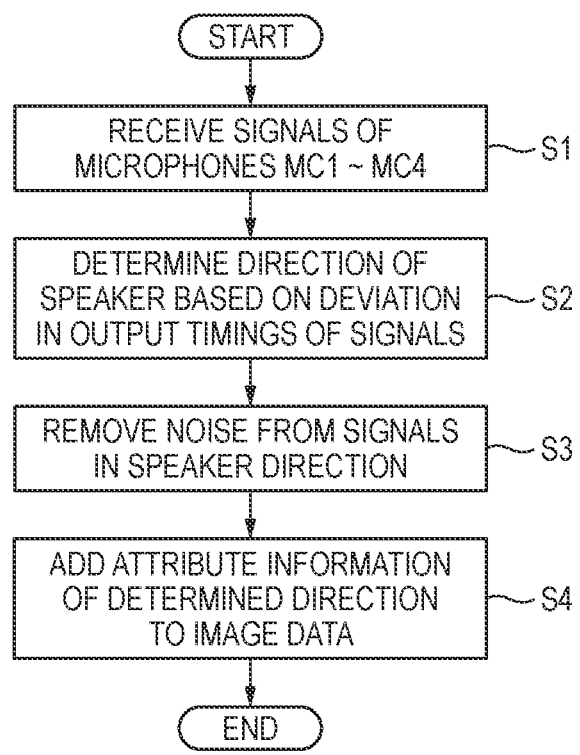
FIG. 11 is a flowchart illustrating an operation example of the wearable camera.

FIG. 11 is a flowchart illustrating an operation example of the wearable camera 1. The controller 19 may execute the processing of the flowchart illustrated in FIG. 11 during recording.

The controller 19 receives the signals from the microphones MC1 to MC4 (Step S1).

The controller 19 determines the direction of the speaker based on the deviation in the output timings of the signals received in Step S1 (Step S2).

For example, the controller 19 may determine the direction of the speaker based on the output order of the signals output from the microphones MC1 to MC4.

The controller 19 may determine the sound emission direction (angle) with reference to the front direction of the wearable camera 1 (for example, the front direction of the wearable camera 1 is 0 degrees) based on the output time difference of the signals received in Step S1. In other words, the control unit 19 may determine the sound emission direction with reference to the front direction of the wearable camera 1 based on the difference in the arrival times of the sounds.

The controller 19 removes noise from the signals in the direction which is determined in Step S2 (Step S3). For example, the controller 19 removes a signal in a band other than the voice band from the signals which are output from the microphones MC1 to MC4 that collect the sound in the direction determined in Step S2. The controller 19 may remove a signal in a band other than the voice band by using, for example, a digital filter.

The controller 19 adds, as the attribute information, the direction of the speaker determined in Step S2 to the video data (Step S4). When the controller 19 adds the direction of the speaker to the video data as the attribute information, the controller 19 may add time and positional information in the video of the video data to the video data as the attribute information.

In the flowchart of FIG. 11, the controller 19 determines the direction of the speaker, but the disclosure is not limited to this. The controller 19 may also determine the emission direction of a gunshot or a collision sound due to an accident.

In the flowchart of FIG. 11, the attribute information is added during recording, but the disclosure is not limited to this. After stopping the recording, the controller 19 may generate the attribute information from the video data stored in the memory unit 15 and add the attribute information to the video data. For example, when the controller 19 transmits the video data stored in the memory unit 15 to the in-vehicle system 2, the controller 19 determines the sound emission direction from the signals of the microphones MC1 to MC4 included in the video data. The controller 19 adds the determined sound emission direction to the video data as the attribute information. The controller 19 transmits the video data added with the attribute information to the in-vehicle system 2.

As explained above, the wearable camera 1 includes the imaging unit 11, the memory unit 15 configured to store video data captured by the imaging unit 11, the plurality of microphones MC1 to MC4 arranged at different positions of the casing and configured to collect a sound, and the controller 19 configured to determine a direction from which the sound is emitted based on a deviation of the output timings of the signals output from the microphones MC1 to MC4 and add the sound emission direction thus determined as the attribute information to the video data.

Thereby, a police officer can easily create a report based on the video data. For example, the police officer can grasp the sound emission direction by displaying the attribute information included in the video data on the terminal device 4, and can describe the sound emission direction thus grasped in the report. Further, the police officer can grasp, for example, who spoke from the sound emission direction, and can describe the speaker in the report.

Modified Example 1

The number of the microphones is not limited to four. The number of the microphones may be five or more. As the number of the microphones increases, the controller 19 can determine the sound emission direction more finely.

The number of the microphones may be two. For example, the wearable camera 1 may include two microphones MC1 and MC4. In this case, the controller 19 can distinguish between the voice of the police officer wearing the wearable camera 1 and the voice of another person. The controller 19 may add the attribute information indicating that the police officer has spoken to the video data.

Modified Example 2

The controller 19 may distinguish sound emission sources based on the frequencies of the signals output from the microphones MC1 to MC4, and may add identification information for identifying the distinguished emission sources to the video data as the attribute information.

Figure 12:
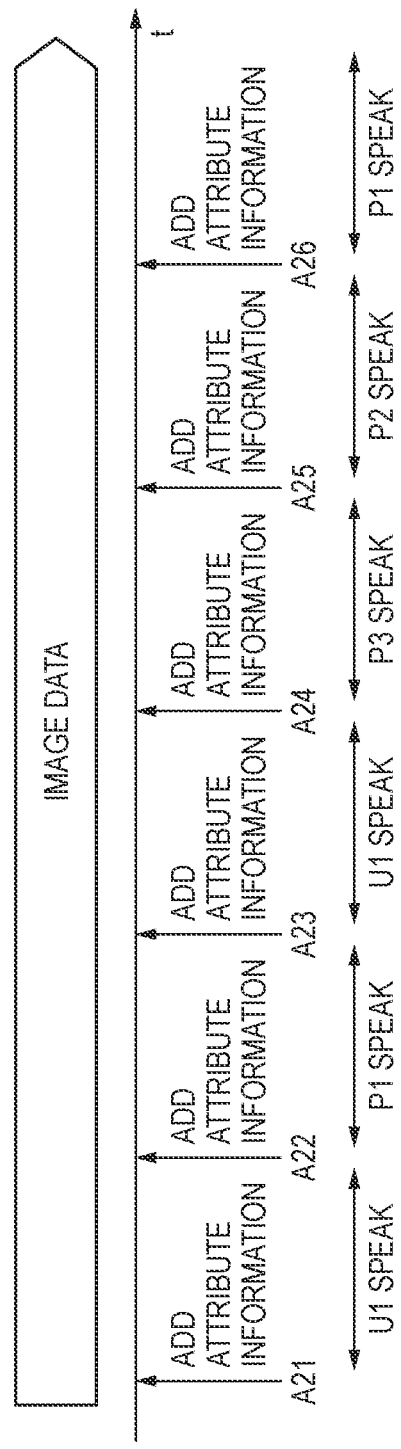
FIG. 12 is a diagram explaining addition of identification information.

FIG. 12 is a diagram explaining the addition of the identification information. For example, FIG. 12 illustrates video data. The video data contains sound data. In FIG. 12, the horizontal axis represents time. The police officer U1 and the person P1 to P3 illustrated in FIG. 5 speak during respective periods indicated by double-headed arrows in FIG. 12.

The controller 19 analyzes the frequencies of signals (sounds) output from the microphones MC1 to MC4. The controller 19 analyzes the frequencies of voices uttered from the police officer U1 and the person P1 to P3, and distinguishes the police officer U1 and the person P1 to P3 as the sound emission sources. The controller 19 generates the identification information for identifying the police officer U1 and the person P1 to P3 thus distinguished and adds the generated identification information to the video data as the attribute information.

For example, when the police officer U1 speaks, the controller 19 generates identification information A of the police officer U1. As indicated by an arrow A21, the controller 19 adds the identification information A as the attribute information to the video data at the time when the police officer U1 has started speaking.

When the person P1 speaks, the controller 19 generates identification information B different from the identification information A of the police officer U1. As indicated by an arrow A22, the controller 19 adds the identification information B as the attribute information to the video data at the time when the person P1 has started speaking.

When the police officer U1 speaks, as indicated by an arrow A23, the controller 19 adds the already generated identification information A as the attribute information to the video data at the time when the police officer U1 has started speaking.

When the person P3 speaks, the controller 19 generates identification information C different from the identification information A and B of the police officer U1 and the person P1. As indicated by an arrow A24, the controller 19 adds the identification information C as the attribute information to the video data at the time when the person P3 has started speaking.

When the person P2 speaks, the controller 19 generates identification information D different from the identification information A, B and C of the police officer U1 and the persons P1 and P3. As indicated by an arrow A25, the controller 19 adds the identification information D as the attribute information to the video data at the time when the person P2 has started speaking.

When the person P1 speaks, as indicated by an arrow A26, the controller 19 adds the already generated identification information B as the attribute information to the video data at the time when the person P1 has started speaking.

As described above, the controller 19 adds the identification information for identifying the speaker to the video data. This makes it easier for the police officer to create a report. For example, in accordance with an operation of the police officer, the terminal device 4 searches for the identification information which is added to the video data as the attribute information and plays the video data, and thus can selectively play an image or video in which the specific person utters.

Modified Example 3

A user wearing the wearable camera 1 is not limited to a police officer. A user wearing the wearable camera 1 may be a security guard or the like.

Modified Example 4

Figure 13:
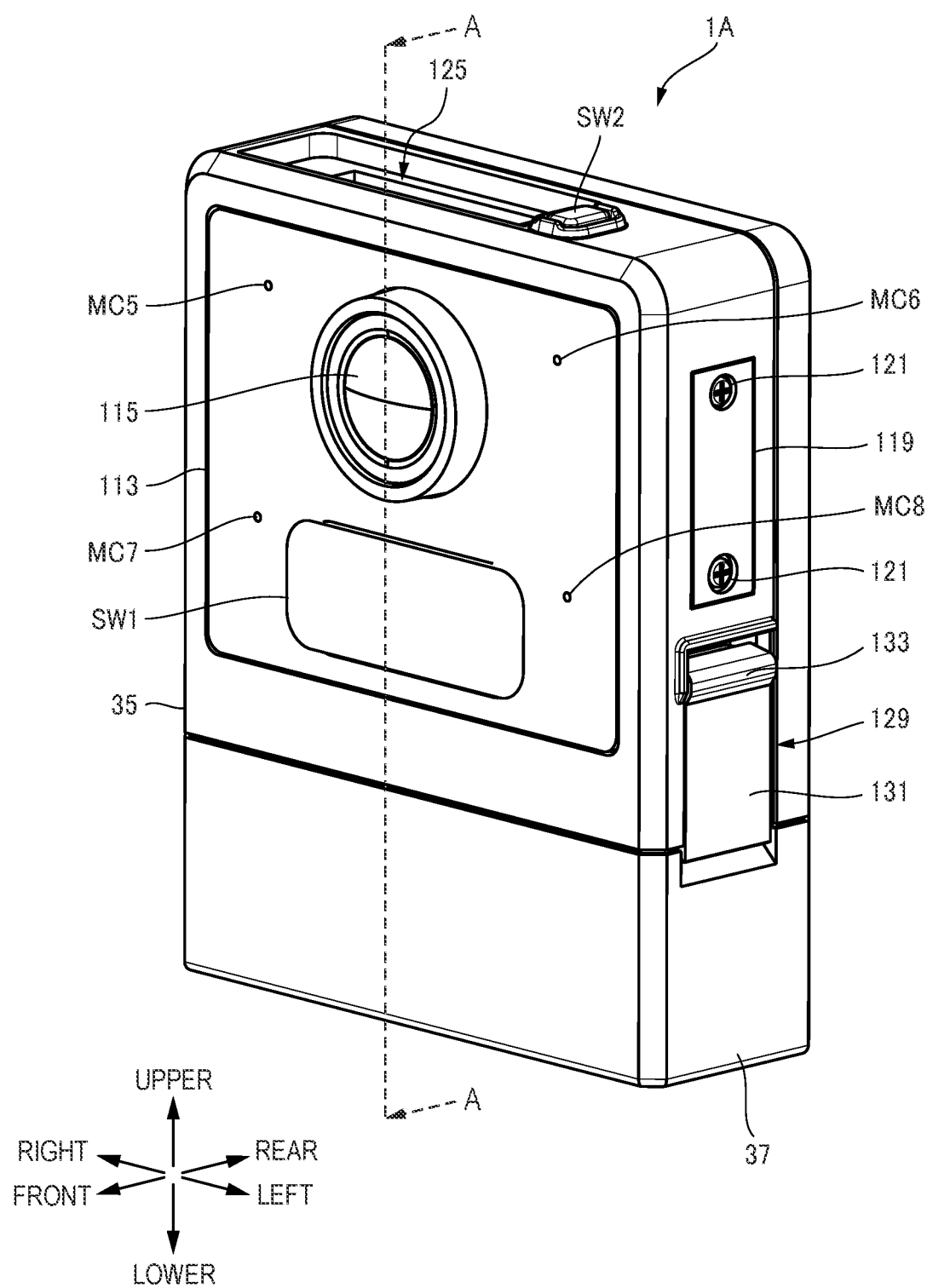
FIG. 13 is a perspective diagram illustrating another example of the appearance of the wearable camera.

FIG. 13 is a perspective diagram illustrating another example of the appearance of a wearable camera 1A. In the following description, the upper, lower, front, rear, left, and right directions are directions indicated by respective arrows in FIG. 13. The wearable camera 1A is used by a police officer as an example of a user. The wearable camera 1A captures a video of a situation around (for example, the front of) a police officer during patrol so that the video thus captured can be stored as a still image (picture) or a moving picture (video), and accumulates the video thus captured as data. The data can be transmitted to, for example, a server device (for example, a back-end server) in a police station. The user of the wearable camera 1A is not limited to a police officer, and the wearable cameras 1A may be used by other security guards at various establishments (for example, a security company).

The wearable camera 1A is used by being attached to the body of a police officer or clothes worn by the police officer (for example, a uniform worn by the police officer) so as to capture a surrounding subject (for example, a front subject) as an image or a video from a position close to the police officer's viewpoint, such as the chest of the police officer. The police officer operates the switch SW1 (for example, a recording switch) to capture a video of surrounding subjects in a state of wearing the wearable camera 1A.

In the wearable camera 1A, a front panel 113 having a substantially quadrangular shape (including a quadrangular shape) is fixed to the front of a substantially rectangular parallelepiped casing having a thin thickness in the front-rear direction. On the front panel 113, an imaging lens 115 constituting an imaging unit, a switch SW1, and a plurality of (for example, four) microphones MC5, MC6, MC7, and MC8 are disposed. The microphones MC5 to MC8 are each, for example, an electret condenser microphone (ECM). When the switch SW1 is pressed by a police officer, for example, for a short time, the recording (in other words, the recording of a captured moving picture) starts. When the switch SW1 is pressed by a police officer, for example, for a long time, the recording (see above) finishes. A USB cap 119 is detachably attached to the left side of the casing by a pair of upper and lower cap attaching screws 121. The USB cap 119 covers a USB interface.

A display panel 125 using an LCD is provided on the top of the casing. A switch SW2 (for example, a snapshot switch) is provided in the vicinity of the display panel 125. Each time the snapshot switch is pressed by a police officer, a still image at that time is captured. On the back of the casing, a stud used when attaching the wearable camera to the clothes is provided so as to protrude rearward. The stud can be easily engaged and disengaged with respect to a clip (not illustrated) attached to the clothes.

A main lock hook 131 constituting a main lock portion 129 is provided on each of the left and right sides of the wearable camera 1A. The main lock hook 131 is formed in a rectangular plate shape that is long in the upper-lower direction. A pressing convex portion 133 is formed on the upper outer surface of the main lock hook 131. Each of the left and right main lock hooks 131 is pivoted outward at the lower end thereof when the pressing convex portion 133 is pushed in.

The casing of the wearable camera 1A is configured of an upper casing 35 and a lower casing 37. The lower casing 37 is smaller than the upper casing 35 and is formed in a rectangular parallelepiped shape that is long in the left-right direction. The lower casing 37 is detachably attached to the bottom of the upper casing 35. The lower casing 37 can be detached from the upper casing 35 by unlocking a lock portion (see below). The lock portion is configured of, for example, a main lock portion 129 and a temporary lock portion 139, and can perform locking by a double lock mechanism. Even if the main lock hook 131 of the main lock portion 129 is swung, if the temporary lock portion 139 is not unlocked, the lock portion holds the lower casing 37 attached to the upper casing 35.

Figure 14:
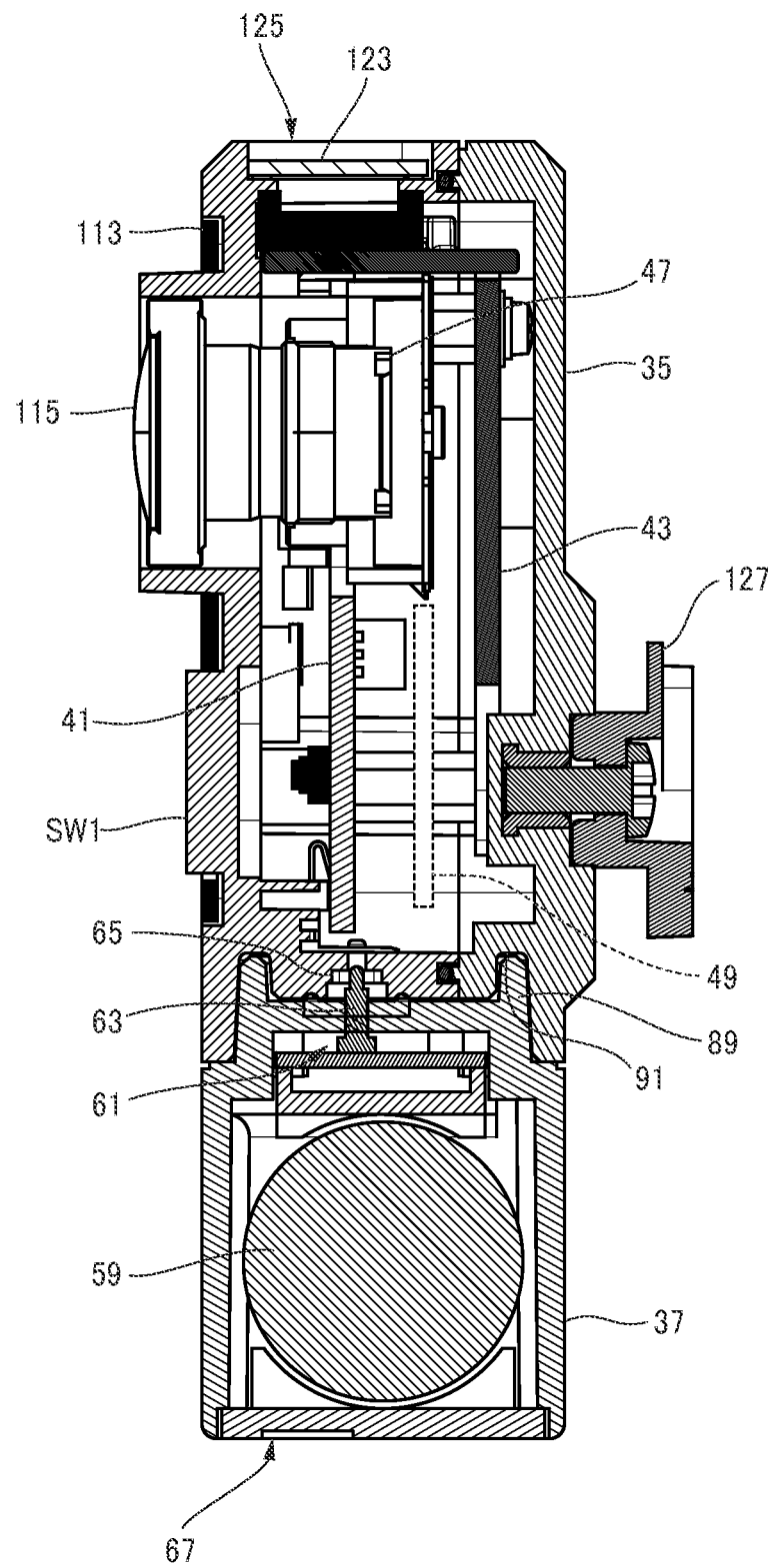
FIG. 14 is a cross-sectional diagram taken along line A-A in FIG. 13.
Figure 15:
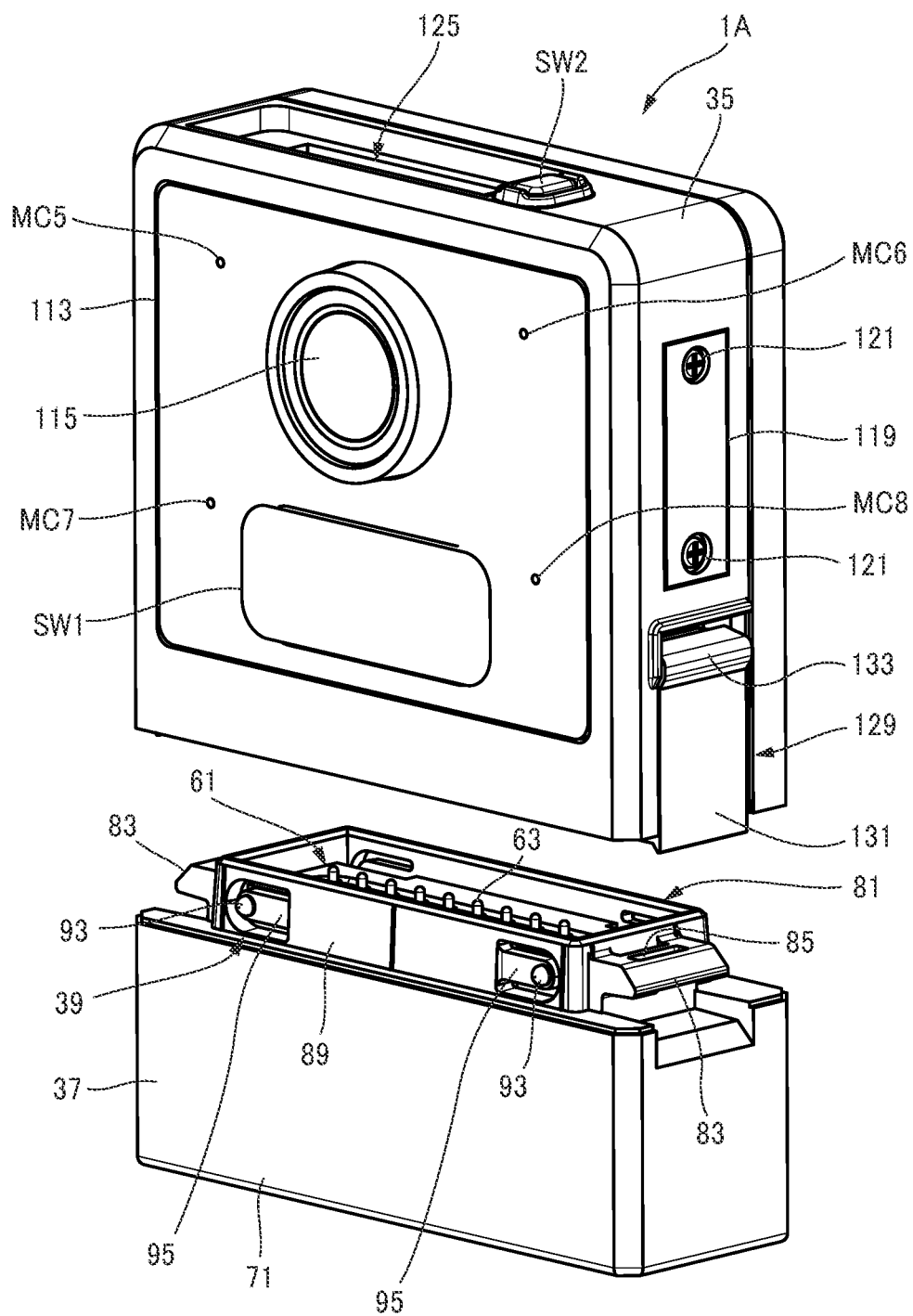
FIG. 15 is an exploded perspective diagram of the wearable camera in which an upper casing and a lower casing are separated.

FIG. 14 is a cross-sectional diagram taken along line A-A in FIG. 13. The upper casing 35 accommodates a first printed circuit board 41 and a second printed circuit board 43 in parallel in the front-rear direction. A wireless Local Area Network (LAN) device is mounted on the first printed circuit board 41 in one chip. The wireless LAN device includes a WLAN communication unit that makes a wireless LAN function and a BLE communication unit that makes Bluetooth (registered trademark) Low Energy as Near Field Communication function. The wireless LAN device may be mounted on the second printed circuit board 43. The upper casing 35 accommodates an imaging unit 47 having a Charge Coupled Device (CCD) and the like. Either the first printed circuit board 41 or the second printed circuit board 43 is provided with a Micro Control Unit (MCU) as a controller that controls the imaging process of the imaging unit 47 and the charging process of the battery.

The wearable camera 1A can perform wireless communication compliant with Long Term Evolution (LTE) as an example of the standard for wide-area wireless communication using a mobile phone network. In the wearable camera 1A, as an option, an LTE printed circuit board 49, on which an LTE device that constitutes a wide area network communication unit is mounted, is added between the first printed circuit board 41 and the second printed circuit board 43.

A cylindrical battery 59 is accommodated in the lower casing 37 such that the axis of the battery extends in the left-right direction. That is, the lower casing 37 is a battery case. The battery 59 supplies power to the first printed circuit board 41, the second printed circuit board 43, and the like accommodated in the upper casing 35 via an inner contact terminal 61 provided in the lower casing 37. In the inner contact terminal 61, a plurality of pin terminals 63, which is arranged in the left-right direction in the lower casing 37, protrudes from the top of the lower casing 37 toward the bottom of the upper casing 35. In this example, the inner contact terminal 61 has, for example, nine pin terminals 63. When the upper casing 35 and the lower casing 37 are attached to each other, the pin terminals 63 of the inner contact terminal 61 are conductively connected to the same number of counterpart terminals 65 provided on the bottom of the upper casing 35.

A contact terminal 67 for charging from a charging stand 71 is provided on the bottom of the lower casing 37. The contact terminal 67 is configured to expose a plurality of terminal pieces 69, which is arranged in the left-right direction of the lower casing 37, on the bottom of the lower casing 37. The contact terminal 67 has, for example, five terminal pieces 69. The five terminal pieces 69 exposed on the bottom of the lower casing 37 are used when the wearable camera 1A is set on the charging stand 71 and charged with the lower casing 37 attached to the upper casing 35.

That is, in the wearable camera 1A, the inner contact terminal 61 is provided with a larger number of the terminals than the contact terminal 67 which is used when the wearable camera is set on the charging stand 71 and charged.

In the wearable camera 1A, the upper casing 35 and the lower casing 37 have a double lock portion which includes the temporary lock portion 139 and the main lock portion 129. The main lock portion 129 performs main lock after temporary lock which is performed by the temporary lock portion 139. The pressing convex portion 133 is formed on the upper outer surface of the main lock hook 131 of the main lock portion 129. On the lower inner surface of the main lock hook 131, a hook claw projects toward the inside of the casing. The left and right main lock hooks 131, with the hook claws protruding toward the inside at the lower inner surfaces, are L-shaped and inverted L-shaped, respectively, when viewed from the front side. The main lock hook 131 is provided, at the upper inner surface thereof, with a bearing portion through which a shaft 75 penetrates. The shafts of the left and right main lock hooks 131 are supported by the upper casing 35. With such a configuration, in each of the main lock hooks 131, when the pressing convex portion 133 is pushed in, the hook claw at the lower end of the main lock hook swings outward.

A leaf spring is sandwiched between the side of the upper casing 35 and the main lock hook 131. The lower end of the leaf spring is in contact with the side of the upper casing 35, and the upper end of the leaf spring is in contact with the upper side of the lock portion rather than the shaft. The leaf spring is arranged in an elastically deformed state, and thereby applies a rotational biasing force to the main lock hook 131 in a direction in which the hook claw approaches the side of the upper casing 35. Therefore, when the pressing convex portion 133 of the main lock hook 131 is pushed in with a finger, the hook claw is swung outward. When the finger is released, the main lock hook 131 is rotated in the direction in which the hook claw approaches again the side of the upper casing 35 by the biasing force of the leaf spring.

On the top of the lower casing 37, a block portion 81 that fits on the bottom of the upper casing 35 protrudes. When the main lock hooks 131 are rotated in the direction approaching both sides of the upper casing 35, the main lock hooks 131 are locked to claw locking portions 83 formed on the left and right sides of the block portion 81. The claw locking portion 83 is formed in a rectangular plate shape in plan view and protrudes perpendicularly from the side of the block portion 81. In the claw locking portion 83, the side portion of the protruding tip thereof serves as a locking guide surface which is formed with a downward slope toward the tip. The locking guide surface smoothly guides the hook claw to the locked state. A rectangular through hole 85 penetrating in the upper-lower direction is formed in the center of the claw locking portion 83. The through hole 85 receives a beak portion formed at the tip of the hook claw so as not to interfere. As a result, the main locking of the main lock hook 131 to the lower casing 37 is securely performed.

A rectangular peripheral wall 89 surrounding the inner contact terminal 61 is erected on the top of the block portion 81. The peripheral wall 89 is fitted into a rectangular peripheral groove 91 formed on the bottom of the upper casing 35. As a result, the upper casing 35 and the lower casing 37, whose separation in the upper-lower direction is restricted by the main lock hooks 131, are securely fixed to each other without rattling in the front-rear and left-right directions.

The temporary lock portion 139 has a plurality of temporary lock protrusions 93. A pair of left and right temporary lock protrusions 93 are provided on each of the front and rear surfaces of the peripheral wall 89 that erects on the block portion 81. That is, a total of four temporary lock protrusions 93 are formed. Each temporary lock projection 93 is formed as a cantilever-like elastic locking piece 95 having a free end at the tip thereof by making a U-shaped cut in the peripheral wall 89. The elastic locking piece 95 has a hemispherical protrusion formed on the outer surface on the tip side thereof.

The protrusions are fitted into respective protrusion fitting recesses 97 formed on the lower front inner wall surface and the lower rear inner wall surface of the upper casing 35. The protrusion of the temporary lock protrusion 93 is locked to the protrusion fitting recess 97 immediately before the main lock hook 131 is locked to the claw locking portion 83 and thus the main lock is performed. When the temporary lock protrusions 93 are locked to the protrusion fitting recesses 97, the lower casing 37 is coupled to the upper casing 35 with a degree of freedom without dropping. That is, the lower casing 37 can be temporarily fixed to the upper casing 35 before the main lock. By providing four temporary lock protrusions 93, all four of the temporary lock protrusions can be sequentially locked to the protrusion fitting recesses, and the temporary lock can be easily performed.

By pressing the pressing convex portion 133 of the main lock hook 131 against the biasing force of the leaf spring, the hook claw can be detached from the claw locking portion 83, and thus the main lock of the main lock portion 129 can be released. The temporary lock of the temporary lock portion 139 can be released in such a way that the lower casing 37 is pulled away from the upper casing 35 to such an extent that the four elastic locking pieces 95 are separated from the respective protrusion fitting recesses 97, thereby elastically deforming the elastic locking pieces 95 in a direction in which the protrusions of the elastic locking pieces 95 are separated from the protrusion fitting recesses 97.

As described above, the casing of the wearable camera 1A according to the modified example 4 is configured such that the upper casing 35 and the lower casing 37 are detachable. Therefore, the plurality of (specifically, four) microphones MC5 to MC8 is arranged apart from each other on the front side of the upper casing 35 so as to surround the imaging lens 115. The four microphones MC5 to MC8 are arranged so as to surround the imaging lens 115 because the microphones MC5 to MC8 need to be sufficiently separated from each other in order to detect the direction of a voice (for example, the voice of a police officer wearing the wearable camera 1A or a criminal) or a sound (for example, a gunshot) emitted around the wearable camera 1A with high accuracy. To meet that need, a projection that covers the imaging lens 115 is provided at the approximate center on the front side of the upper casing 35. In other words, the four microphones MC5 to MC8 are arranged separately by the protrusion of the imaging lens 115.

In the wearable camera 1A, the casing is configured by the upper casing 35 and the lower casing 37. The upper casing 35 accommodates the imaging unit (for example, the imaging lens 115) and the plurality of sound collectors (for example, the microphones MC5 to MC8). The lower casing 37 is detachable from the upper casing 35 and accommodates the battery 59 that supplies power to the upper casing 35.

In the wearable camera 1A, the lower casing 37 can be detached from the upper casing 35. The wearable camera 1A can include a spare lower casing 37 that accommodates a battery 59. The wearable camera 1A can charge the battery 59 accommodated in the spare lower casing 37 while using the upper casing 35 and the lower casing 37 integrated with each other. Thus, when the battery 59 of the lower casing 37 is discharged, the wearable camera 1A can supply power to the upper casing 35 only by replacing the lower casing 37 with the spare lower casing 37. That is, it is not necessary to wait for the use of the wearable camera 1A until the charging of the battery 59 is completed. Therefore, the charging time does not become an idle time, and the wearable camera 1A can be used for a long time in a continuous state only by replacing the lower casing 37. As a result, it is possible to avoid that the wearable camera 1A cannot be used due to charging restrictions.

Therefore, according to the wearable camera 1A, it is possible to avoid the user's unusable state based on restrictions on charging of the battery 59 accommodated in the casing, and to improve the user's usability.

In the wearable camera 1A, the lower casing 37 has the inner contact terminal 61 that is used to supply power from the battery 59 to the upper casing 35. The battery 59 is charged by the charging stand 71 via the inner contact terminal 61 while the lower casing 37 is detached from the upper casing 35.

In this wearable camera 1A, when the lower casing 37 detached from the upper casing 35 is set alone on the charging stand 71, the contact terminal 67 of the lower casing 37 is not used. The lower casing 37 is provided with the contact terminal 67 which is disposed on, for example, the bottom of this casing and the inner contact terminal 61 which is disposed on the top of this casing opposite to the bottom. When the lower casing 37 is integrally attached to the upper casing 35, power is supplied to the upper casing 35 via the inner contact terminal 61. When the lower casing 37 attached integrally with the upper casing 35 is set on the charging stand 71 and charging is performed, the controller 19 of the upper casing 35 monitors the charging status of the battery 59 in the lower casing 37 via the inner contact terminal 61. By using the inner contact terminal 61, the lower casing 37 can be charged by itself using the charging stand 71. In other words, the lower casing 37 can be charged using the charging stand 71 either by itself or integrally with the upper casing 35.

In the wearable camera 1A, the plurality of sound collectors (for example, the microphones MC5 to MC8) is arranged apart from each other so as to surround the imaging unit (for example, the imaging lens 115). Therefore, voices or sounds collected by the microphones MC5 to MC8 can be easily separated, and the controller 19 can easily specify the direction of the emission source of the voice or sound collected by the wearable camera 1A.

In the wearable camera 1A, the upper casing 35 is configured in a substantially rectangular shape. The plurality of sound collectors (for example, the microphones MC5 to MC8) is arranged along respective four sides of the substantially rectangular shape. As a result, the distance between the microphones can be ensured, and the controller 19 of the wearable camera 1A can easily specify the direction of the sound source with higher accuracy.

Each functional block used in the description of the embodiment is typically realized as an LSI which is an integrated circuit. These functional blocks may be individually made into one chip, or may be made into one chip so as to include a part or all of the functional blocks. Although the integrated circuit is an LSI in this case, the integrated circuit may be called an IC, a system LSI, a super LSI, or an ultra LSI depending on the degree of integration.

The method of circuit integration is not limited to an LSI, and the circuit integration may be realized by a dedicated circuit or a general-purpose processor. An field programmable gate array (FPGA) that can be programmed after manufacturing an LSI or a reconfigurable processor that can reconfigure the connection and setting of circuit cells inside an LSI may be used.

If integrated circuit technology that replaces an LSI emerges as a result of advances in the semiconductor technology or other technology derived from the semiconductor technology, it is naturally also possible to integrate the functional blocks using the emerged integrated circuit technology. As such an integrated circuit technology, a technology using biotechnology, or the like may be possible.

The present disclosure is useful, for example, for a wearable camera that is attached to a police officer and performs imaging.

The present application is based upon Japanese Patent Application (Patent Application No. 2019-044753 filed on Mar. 12, 2019), the contents of which are incorporated herein by reference.

What is claimed is:

1. A wearable camera comprising:
   a casing;
   a capturing unit that is configured to capture video data;
   a memory that is configured to store the video data captured by the capturing unit;
   a switch that is configured to control the capture of the video data;
   a plurality of sound collectors that are configured to collect a sound and output signals, wherein
      the capturing unit, the switch, and the plurality of sound collectors are positioned on a same side of the casing, and
      the plurality of sound collectors include first, second, third, and fourth sound collectors that are positioned at respective sides of the switch and that are adjacent to respective ends of the casing; and a controller that is configured to determine a direction from which the sound is emitted based on a deviation of output timings of the signals and add the direction as attribute information to the video data.

2. The wearable camera according to claim 1, wherein the wearable camera is configured to be disposed beneath a face of a user who wears or holds the wearable camera such that a front of the casing faces forward with respect to the user, and the first sound collector is disposed closer to the face of the user than the second sound collector.

3. The wearable camera according to claim 2, wherein the third sound collector and the fourth sound collector are disposed on a left position and a right position with respect to a line connecting the first and second sound collectors, respectively.

4. The wearable camera according to claim 1, wherein the controller distinguishes an emission source of the sound based on frequencies of the signals output from the sound collectors, and adds identification information for identifying the emission source of the sound to the video data as the attribute information.

5. The wearable camera according to claim 1, wherein the casing comprises: an upper casing which accommodates the capturing unit and the plurality of sound collectors; and a lower casing which is detachable from the upper casing and accommodates a battery that supplies power to the upper casing.

6. The wearable camera according to claim 5, wherein the upper casing is formed in a substantially rectangular shape, and the plurality of sound collectors are arranged along respective four sides of the substantially rectangular shape.

7. The wearable camera according to claim 1, wherein the attribute information is added to the video data for a starting time of the sound.

8. The wearable camera according to claim 1, wherein the sound is a sound signal of at least one of a gunshot or a collision.

9. A video data generation method implemented by a wearable camera, comprising:

determining a direction from which a sound is emitted based on a deviation of output timings of signals which are respectively output from a plurality of sound collectors, wherein the wearable camera includes a casing, a capturing unit configured to capture video data, a switch configured to control the capture of the video data, and the plurality of sound collectors configured to collect the sound and output the signals, the capturing unit, the switch, and the plurality of sound collectors are positioned on a same side of the casing, and the plurality of sound collectors include first, second, third, and fourth sound collectors that are positioned at respective sides of the switch and that are adjacent to respective ends of the casing; and adding the direction as attribute information to the video data.

\* \* \* \* \*